No. 615,213. Patented Nov. 29, 1898.
W. L. DEMING.
SPRAYING APPARATUS.
(Application filed May 7, 1898.)
(No Model.)
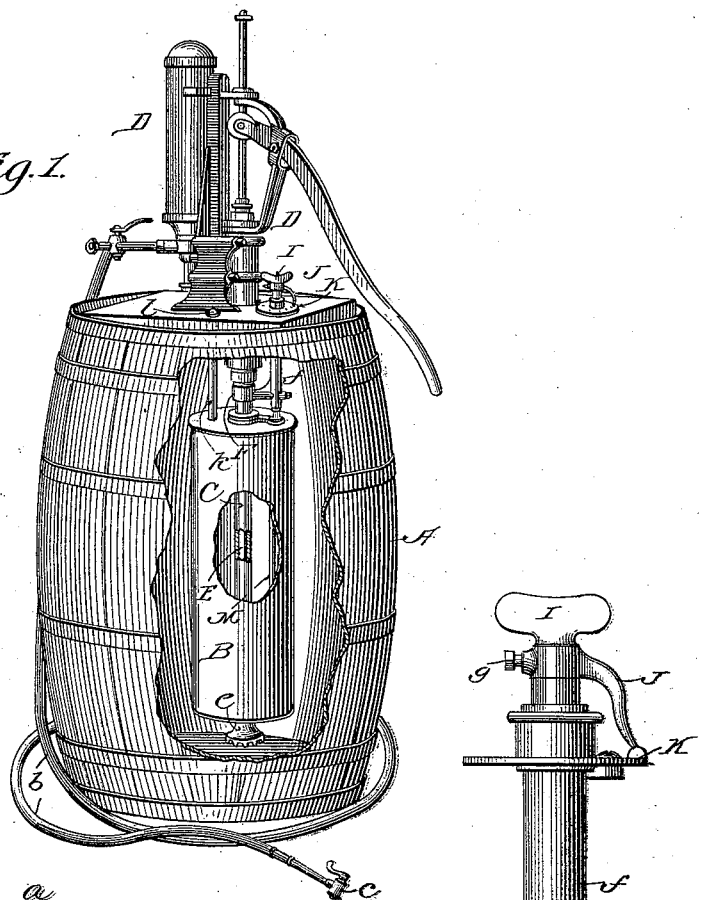
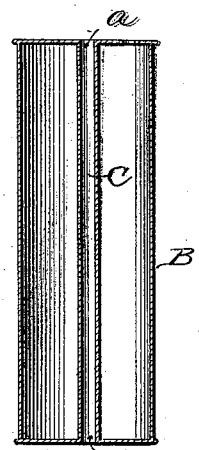
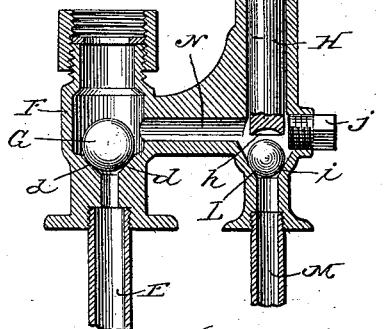

UNITED STATES PATENT OFFICE.

WILLIAM L. DEMING, OF SALEM, OHIO, ASSIGNOR TO THE DEMING COMPANY, OF SAME PLACE.

SPRAYING APPARATUS.

SPECIFICATION forming part of Letters Patent No. 615,213, dated November 29, 1898.

Application filed May 7, 1898. Serial No. 680,163. (No model.)

*To all whom it may concern:*

Be it known that I, WILLIAM L. DEMING, a citizen of the United States, residing at Salem, in the county of Columbiana and State of Ohio, have invented certain new and useful Improvements in Spraying Apparatus; and I do hereby declare the following to be a full, clear, and exact description of the invention, such as will enable others skilled in the art to which it appertains to make and use the same.

My invention relates to the art of fruit-growing, and has for its object the treatment of trees, bushes, or plants with suitable fungicides or insecticides for the purpose of preventing or curing plant diseases and of exterminating insects and insect life common to all forms of vegetation.

As a further object the invention provides for the thorough admixture of liquids at the instant of application, also the use of such spraying mixtures upon a large scale and in proportions best suited to the particular subject under treatment or surrounding conditions.

The invention will be hereinafter described, and particularly pointed out in the claims following.

In the accompanying drawings, which form part of this specification, Figure 1 is a perspective view of a barrel supply-tank, force-pump, delivery-hose, and terminal spraying-nozzle, said tank being partly in section for the purpose of exposing an auxiliary tank of less proportions and the latter in turn broken away to display a within-contained suction-pipe and its surrounding sleeve. Fig. 2 is a longitudinal central section of said auxiliary tank detached; and Fig. 3 is a sectional view of main and supplemental intake-ports for communicating with the pump, including suitable check-valves, one of which is also a graduated valve under control of an indicator shown in side elevation above.

Corresponding letters of reference indicate like parts in the several figures.

A represents the main supply-tank, of liberal dimensions, an ordinary water-tight barrel being shown in the present instance for purposes of illustration. Within tank A is suspended a second or auxiliary tank B of cylindrical form, perforated throughout its longitudinal center by a sleeve or tubular division C, having no communication whatever with the interior of tank B, but open at each end, as at $a\ a$. (Best shown by Fig. 2.)

D indicates a force-pump, which may be of any approved pattern, fitted with a section of discharge-tubing $b$, terminating in a suitable spraying-nozzle $c$. Depending from the pump D is a suction-pipe E, provided with a cast valve-case F, containing seat $d$, within which is located a main check-valve G. Continuing downward, suction-pipe E passes entirely through tubular sleeve C and terminates in an ordinary screened intake or foot $e$ adjacent to the bottom of the main tank A.

Casting F, to one side of the main valve G, merges into an upright housing or support $f$ for valve-stem H, the latter being in screw-threaded connection with the former, thereby providing for vertical adjustment. Secured to the upper end of stem H by means of set-screw $g$ is a wing-nut I for rotating said stem, the degree of such rotation being indicated by index J upon a fixed horizontal scale-plate K, located in plain view above tank A. The lower extremity of stem H is configured by concavity $h$, adapted to receive at times an auxiliary check-valve L, resting upon its valve-seat $i$ and employed for the purpose of determining and limiting its upward movement in accordance with the degree indicated upon plate K.

Below valve L, extending into the auxiliary tank B to near its lower end, is a supplemental suction-pipe M, terminating in an ordinary intake-foot (not shown) for admitting the contents of said tank B, while communication is established between the suction-pipes E M by way of cross-channel N above valves G L, preferably drilled from the outside in, its outer end then being closed by means of plug $j$, as shown.

In connection with tank B there is also provided a small oil-filling port $k$, which as a matter of convenience is continued upward and is finished by a screw-cap $l$ in plain view above the upper head or end of main tank A.

Having thus described the construction of my invention, I will now proceed to set forth its use and operation, it being understood in the first place that the apparatus is portable.

in the sense that it may be loaded onto a wagon or other vehicle for convenience of transportation through orchards, vineyards, or gardens.

In its chief use the apparatus is employed for mixing and delivering a mixture of water and kerosene-oil in mist-like spray for use as an insecticide. To this end main supply-tank A is filled with water and auxiliary tank B, contained within the former, filled with kerosene-oil, the contents of each tank being entirely separate from the other. The action of force-pump D now serves to draw water at foot or intake e, passing same up through suction-pipe E, past check-valve G, to the pump proper above. Simultaneously with the above auxiliary suction-pipe M goes into action and takes from tank B a quantity of kerosene proportionate to the position of valve-stem H with relation to ball-valve L, the movement of which it controls. Rotation of the stem H in screw-threaded connection with its support f one way or the other serves to elevate or depress said stem and to regulate accordingly the movement of valve L, all as indicated above, by means of index J and scale-plate K, provided for the purpose. Oil from auxiliary tank B drawn thus up suction-pipe M elevates valve L, passes thence through cross-channel N to the outlet-pipe E above check-valve G, where it meets and mingles with the flow of water previously noted. Continuing the mixture is driven through the valves and cylinder of the pump and discharge tube or hose b and terminal nozzle c, whereupon it is converted into a mist-like spray, the proportions of oil and water being at all times determined and maintained by the relative positions of valve L and its vertically-adjustable stem H.

In the construction and arrangement of parts herein shown and described a most efficient, compact, and economical spraying apparatus is produced, in which it will be noted that the arrangement of sleeve or tubular division C performs the several equally important functions of centralizing the weight in auxiliary tank B, distributing strains to the greatest possible advantage, facilitating the removal of pump and auxiliary tank without detachment, and permitting said auxiliary tank to be centrally pierced by and supported upon the main suction-pipe E without the necessity of packing said pipe at points of entering and leaving the tank.

Having thus described my invention, I claim and desire to secure by Letters Patent the following:

1. In a spraying apparatus the combination with a pump, of main and auxiliary supply-tanks the latter supported upon the suction-pipe of said pump and containing an independent suction-pipe, substantially as described.

2. In a spraying apparatus the combination with a pump, of main and auxiliary supply-tanks the latter contained within the former and supported upon the suction-pipe of said pump, substantially as described.

3. In a spraying apparatus the combination with a pump, of main and auxiliary supply-tanks the latter supported upon and intersected by the suction-pipe of said pump, substantially as described.

4. In a spraying apparatus the combination with a pump, of main and auxiliary supply-tanks the latter intersected by an independent sleeve for receiving the suction-pipe of said pump, substantially as described.

5. In a spraying apparatus the combination with a pump, of main and auxiliary supply-tanks one within the other, a suction-pipe in each of said tanks, and an independent sleeve passing through the longitudinal center of said auxiliary tank for receiving the main suction-pipe, substantially as described.

6. In a spraying apparatus the combination with a pump, of main and auxiliary supply-tanks one within the other, a suction-pipe in each of said tanks, a sleeve intersecting said auxiliary tank for receiving the main suction-pipe, and a graduating-valve for establishing a predetermined ratio of supply from the tanks, substantially as described.

7. In a spraying apparatus the combination with a pump, of main and auxiliary supply-tanks one within the other, a suction-pipe in each of said tanks, a sleeve intersecting said auxiliary tank for receiving the main suction-pipe, a filling-port communicating with the interior of the last-named tank, a graduating-valve for establishing a predetermined ratio of supply from the tanks, and suitable check-valves for preventing a return flow to said tanks, substantially as described.

In testimony whereof I subscribe my signature in presence of two witnesses.

WILLIAM L. DEMING.

Witnesses:
WM. E. DYRE,
HUGH M. STERLING.